United States Patent
Hotes et al.

(10) Patent No.: US 10,050,900 B2
(45) Date of Patent: *Aug. 14, 2018

(54) METHODS AND SYSTEMS FOR ALLOCATING AND PROVISIONING COMPUTING RESOURCES

(71) Applicant: LEVEL 3 COMMUNICATIONS, LLC, Broomfield, CO (US)

(72) Inventors: Craig William Hotes, Denver, CO (US); Kevin Dean Wein, Broomfield, CO (US); James Edward Borowicz, Westminster, CO (US); Madhukar Bandi, Broomfield, CO (US); Ken Rumer, Broomfield, CO (US); Nick Taylor, Broomfield, CO (US); Rich Haase, Broomfield, CO (US); William Charles Ramthum, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,511

(22) Filed: Nov. 28, 2016

(65) Prior Publication Data

US 2017/0078217 A1    Mar. 16, 2017

Related U.S. Application Data

(63) Continuation of application No. 13/900,314, filed on May 22, 2013, now Pat. No. 9,509,625.

(Continued)

(51) Int. Cl.
*G06F 15/173* (2006.01)
*H04L 12/911* (2013.01)
*H04L 12/24* (2006.01)

(52) U.S. Cl.
CPC .......... *H04L 47/70* (2013.01); *H04L 41/0806* (2013.01)

(58) Field of Classification Search
USPC ........ 709/201, 203, 223, 224, 225; 370/254; 705/1.1
See application file for complete search history.

(56) References Cited

U.S. PATENT DOCUMENTS

| 6,816,875 | B2 * | 11/2004 | Wollrath | ............... G06F 9/4411 709/201 |
| 7,216,163 | B2 * | 5/2007 | Sinn | .................... H04L 61/1523 709/203 |

(Continued)

OTHER PUBLICATIONS

International Preliminary Report on Patentability, dated Nov. 25, 2014, Int'l Appl. No. PCT/US13/042294, Int'l Filing Date May 22, 2013; 7 pgs.

(Continued)

*Primary Examiner* — Quang N Nguyen

(57) ABSTRACT

Aspects of the present disclosure include systems and methods for the automatic allocation and/or provisioning of various infrastructural computing resources upon which networks, such as telecommunication networks operate. In various aspects, data identifying one or more computing resources needed to implement, support, and/or otherwise facilitate the execution and/or development of a particular computing process, application, software, process, and/or service may be received via one or more interfaces, such as a graphical user-interface ("GUI"). The data may be processed to automatically provision the require resource.

12 Claims, 8 Drawing Sheets

Related U.S. Application Data

(60) Provisional application No. 61/650,201, filed on May 22, 2012.

(56) References Cited

U.S. PATENT DOCUMENTS

| | | | |
|---|---|---|---|
| 7,475,136 B2* | 1/2009 | Sinn | H04L 61/1523 709/223 |
| 7,509,360 B2 | 3/2009 | Wollrath et al. | |
| 7,739,308 B2 | 6/2010 | Baffier et al. | |
| 8,000,260 B2* | 8/2011 | Brady | G06Q 10/06 370/254 |
| 8,863,137 B2* | 10/2014 | Keller | G06F 9/5038 705/1.1 |
| 2004/0243699 A1* | 12/2004 | Koclanes | H04L 29/06 709/225 |
| 2007/0083588 A1 | 4/2007 | Keller et al. | |
| 2013/0132556 A1* | 5/2013 | DeLuca | H04L 43/08 709/224 |
| 2013/0346617 A1 | 12/2013 | Hotes et al. | |

OTHER PUBLICATIONS

International Search Report, dated Dec. 6, 2013, Int'l App. No. PCT/US13/042294, Int'l Filing Date May 22, 2013; 3 pgs.
Written Opinion of the International Searching Authority, dated Dec. 6, 2013, Int'l App. No. PCT/US13/042294, Int'l Filing Date May 22, 2013; 5 pgs.

* cited by examiner

METHODS AND SYSTEMS FOR ALLOCATING AND PROVISIONING COMPUTING RESOURCES

CROSS REFERENCE TO RELATED APPLICATION

The present application is a continuation of and claims priority to U.S. patent application Ser. No. 13/900,314, now U.S. Patent No. 9,509,625, filed May 22, 2013 and issued on Nov. 29, 2016, entitled "METHODS AND SYSTEMS FOR ALLOCATING AND PROVISIONING COMPUTING RESOURCES," filed May 22, 2013, the entire contents of which are incorporated by reference herein for all purposes. U.S. application Ser. No. 13/900,314, now U.S. Pat. No. 9,509,625, claims priority under 35 U.S.C. § 119(e) to U.S. Provisional Application No. 61/650,201, now expired, entitled "METHODS AND SYSTEMS FOR ALLOCATING AND PROVISIONING COMPUTING RESOURCES," filed on May 22, 2012, the entire contents of which are incorporated by reference herein for all purposes.

TECHNICAL FIELD

Aspects of the present disclosure relate to computing resources, and in particular, to the automatic provisioning of computing resources, such as servers.

BACKGROUND

With the advent of wired and wireless networking, the communications industry has been transformed from mainly providing telephone services to providing numerous network services and providing the infrastructure to handle such services including access to the Internet. The unprecedented demand for high-speed network services, particularly for voice, data and video services, has thus transformed the communications industry. Moreover, communications service providers are constantly offering upgraded or new communications products and services to customers. For example, common services include backbone data and voice transport services, cloud computing services, content delivery and distribution services, and voice over internet protocol services.

In addition to the communication providers offering such products and services to customers, it is necessary to provide the infrastructural components required by the communication providers to enable the development of the various applications, processes, and/or business functions that allow the providers to offer such products and services to customers. However, many communication service providers today operate using a variety of heterogeneous computing technologies, business applications, and other resources to perform different business transactions and it is often the case that such systems cannot be efficiently replaced or upgraded, due to their complexity, size, and fragmented nature. As the modern economy becomes more technologically complex and business requirements and opportunities change, many businesses will require the development of new technologies, applications, and resources, as well as integration with new external technologies and systems. Conventional methods for developing such technologies and applications may be time-consuming, labor intensive, and expensive because of inconsistent interfaces, fragmented, differently formatted, and/or redundant data sources, and inflexible architectures.

It is with these problems in mind, among others, that various aspects of the present disclosure were conceived.

SUMMARY

Aspects of the present disclosure involve methods for provisioning a resource. The method is executable by at least one processor and includes receiving provisioning data including one or more selections that identify at least one resource to be provisioned and one or more parameters describing one or more provisioning configurations for the at least one resource. The method further includes processing the one or more parameters to identify at least one workflow process including one or more provisioning steps corresponding to the one or more provisioning configurations. The method includes invoking a workflow engine using the at least one workflow process as input to provision the at least one resource.

Aspects of the present disclosure include systems for provisioning resources. The system includes at least one processor. The at least one processor is configured to receive provisioning data including one or more selections that identify at least one resource to be provisioned and one or more parameters describing one or more provisioning configurations for the at least one resource. The at least one processor is further configured to process the one or more parameters to identify at least one workflow process, the workflow process including one or more provisioning steps corresponding to the one or more provisioning configurations. The at least one processor is configured to invoke a workflow engine using the at least one workflow process as input to provision the at least one resource.

Other aspects of the present disclosure include non-transitory computer-readable mediums encoded with instructions for provisioning a resource. The instructions, executable by at least one processor include receiving provisioning data including one or more selections that identify at least one resource to be provisioned and one or more parameters describing one or more provisioning configurations for the at least one resource. The instructions further include processing the one or more parameters to identify at least one workflow process including one or more provisioning steps corresponding to the one or more provisioning configurations. The instructions include invoking a workflow engine using the at least one workflow process as input to provision the at least one resource.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
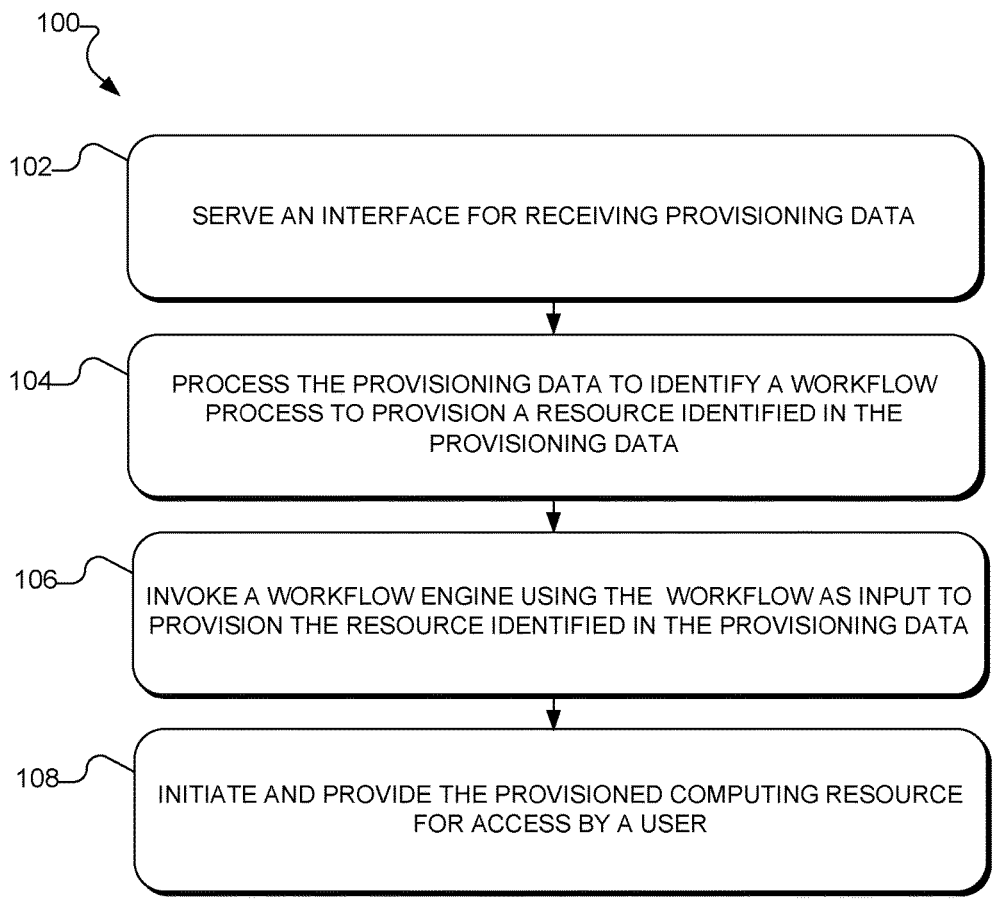
FIG. 1 is a flowchart illustrating an example process for automatically provisioning computing resources, according to aspects of the present disclosure.

Aspects of the present disclosure describe systems and corresponding methods for the automatic allocation and/or provisioning of various infrastructural computing resources upon which networks, such as telecommunication networks, operate. More particularly, various computing resources such as processing systems, servers, websites, databases, application containers, operating systems, memories, and the like, may be automatically provisioned and allocated for use and access. In various aspects, one or more computing resources are identified where the computing resources are needed to implement, support, and/or otherwise facilitate the execution and/or development of a particular computing device, application, software, process, and/or service may be received via one or more interfaces, such as a graphical user-interface ("GUI"). Subsequently, the system identifies a workflow capable of automatically provisioning the desired computing resource. The workflow may be executed by a workflow engine to properly allocate and provision the identified computing resources. When a resource is no longer needed, the resource may be de-allocated for reuse.

Generally, "provisioning" describes the process of preparing, establishing and/or otherwise configuring computing resources to perform and/or function in a particular manner. For example, provisioning a computing resource may include: installing, uninstalling, configuring, upgrading, and/or updating various software components and/or hardware components of, and/or associated with, the specific computing resource being provisioned. In some instances, provisioning systems are used to provision computing resources and provide interfaces, such as GUIs, that allow users to define and execute provisioning procedures, such as a provisioning script (a sequence of pre-defined provisioning instructions) and/or workflow process.

Aspects of the present disclosure involve mechanisms for automatically provisioning, installing, and/or configuring various infrastructural components that may be used to support the various functions of a business or enterprise, such a telecommunications service provider. For example, a business may be interested in developing a word processing application for internal use within the enterprise. In order to properly execute the word processing application, one or more pieces of computational infrastructure may be required, such as a database, a server, and a specific allocation of memory. Specifically, the word processing application may require 1 gigabyte RAM memory, 3.0 gigabytes of available disk space (e.g. a database) and an application server in order to enable the word processing application to successfully execute and perform in an optimal manner. Aspects of the present disclosure may automatically provision the required resources—the database, application server, and required memory—in response to a request for such resources. In contrast, conventional methods would require a systems administrator to manually configure the required memory allocations, disk space, and application server, and subsequently notify the business when done. Such manual provisioning of desired resources is time-consuming, labor-intensive, and expensive.

Figure 2:
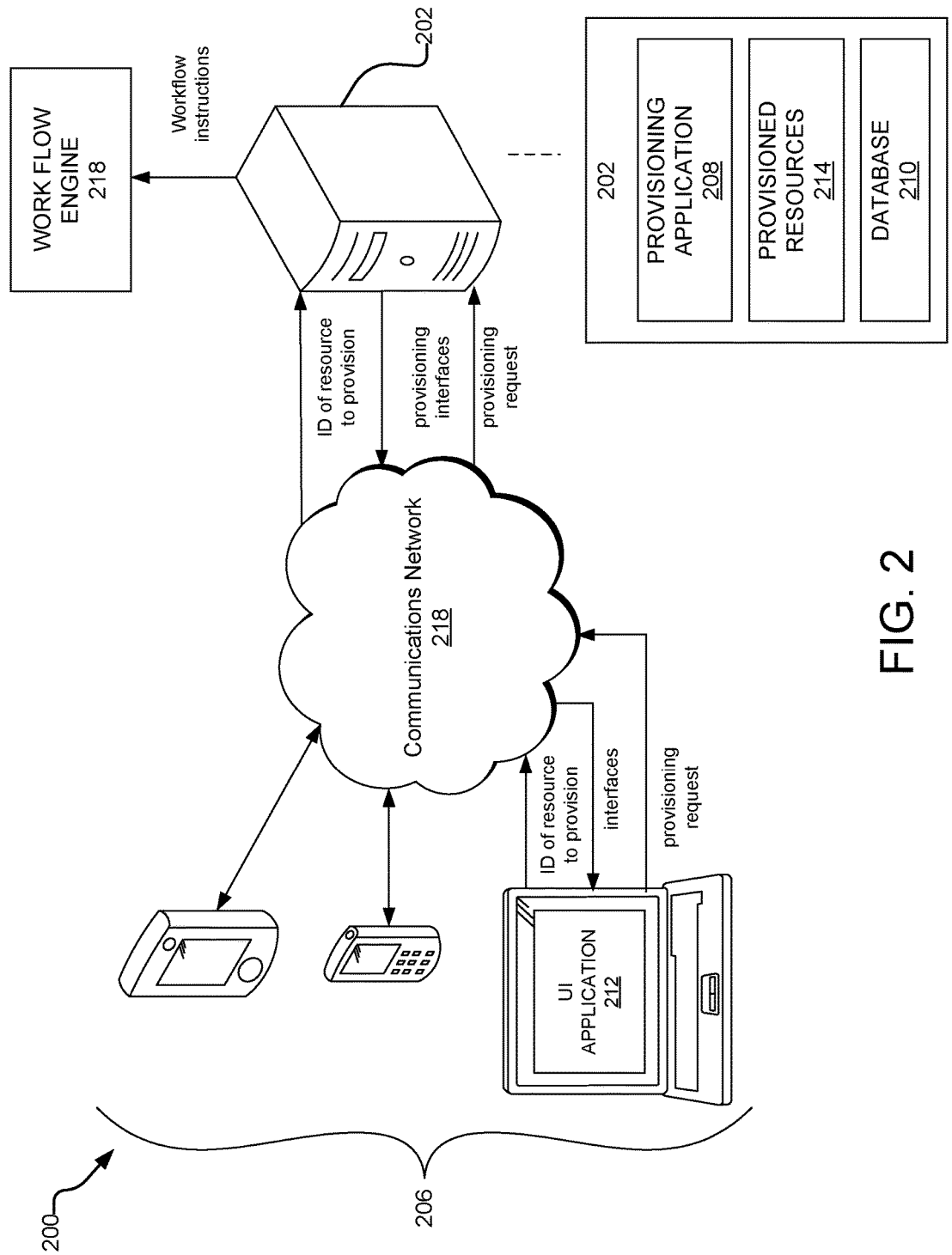
FIG. 2 is block diagram illustrating a computing environment for automatically provisioning computing resources, according to aspects of the present disclosure.

An illustrative process and system for automatically provisioning and/or allocating computing resources, is depicted in FIGS. 1-2. In particular, FIG. 1 illustrates an example process 100 for providing one or more interactive interfaces for receiving data that may be processed to provision a particular computing resource. FIG. 2 illustrates a computing environment 200 including a server 202 configured to generate the one or more interfaces that enable the users to provision various computing resources. More specifically, FIG. 2 illustrates a computing environment 200 including a server 202 operating in conjunction with various other hardware and/or software components that may be used to perform or otherwise execute the process 100.

Referring now to FIG. 1, process 100 begins with generating one or more interactive interfaces/input forms (e.g. a user-interface or graphical user-interface (GUI)) for receiving provisioning data (operation 102). For example, as illustrated in FIG. 2, the server 202 may execute a provisioning application 208 that generates and/or otherwise provides one or more GUIs, which may include interactive elements, such as buttons, forms, fields, selections, inputs, streams, images, etc., for receiving input, such as provisioning data. The provisioning data may include any information describing one or more computing resources that may be provisioned in order to support the initiation and execution of a particular computing application, process, and/or service. Referring to the word processing example above, the provisioning data may identify the database, the application server, and the memory allocation required to properly execute the word processing application.

In one particular embodiment, the provisioning data may include parameters that describe various characteristics, components, aspects, subcomponents and/or external/separate associated resources that are implemented, installed, configured, and/or otherwise customized to provision and allocate a particular computing resource. For example, if the selected computing resource to be provisioned is a database, a user, via a generated GUI, may make one or more selections indicating the type of data replication the database may implement. As another example, a selection may be made indicating whether the database will implement clustering, and if so, the cluster type. Thus, for each category of provisioning requests, a corresponding defined list of parameters supported for that kind of provisioning may be provided for configuration.

Figure 3A:
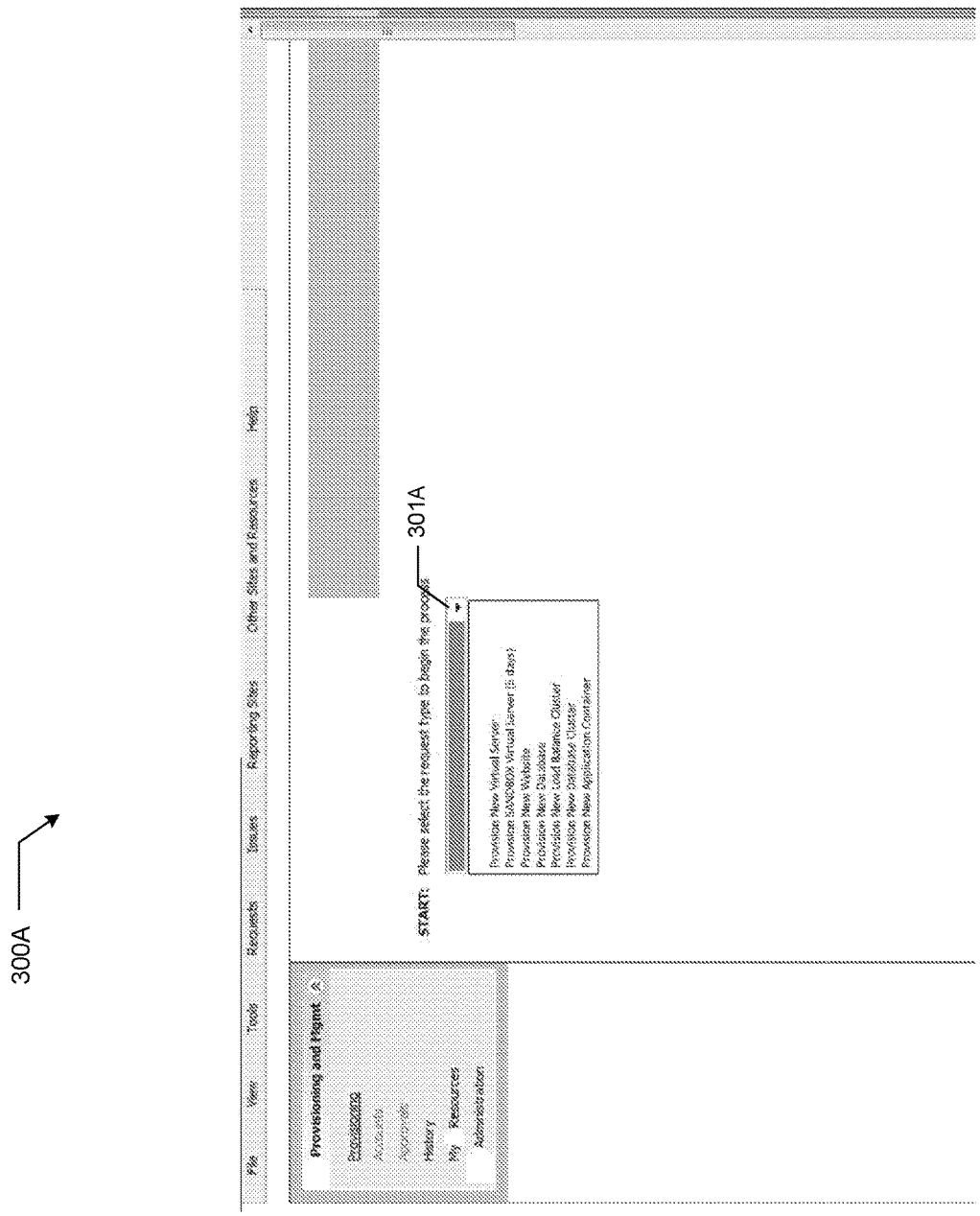
FIGS. 3A-3D illustrate example screen shots of an automatic provisioning application, according to aspects of the present disclosure.
Figure 3B:
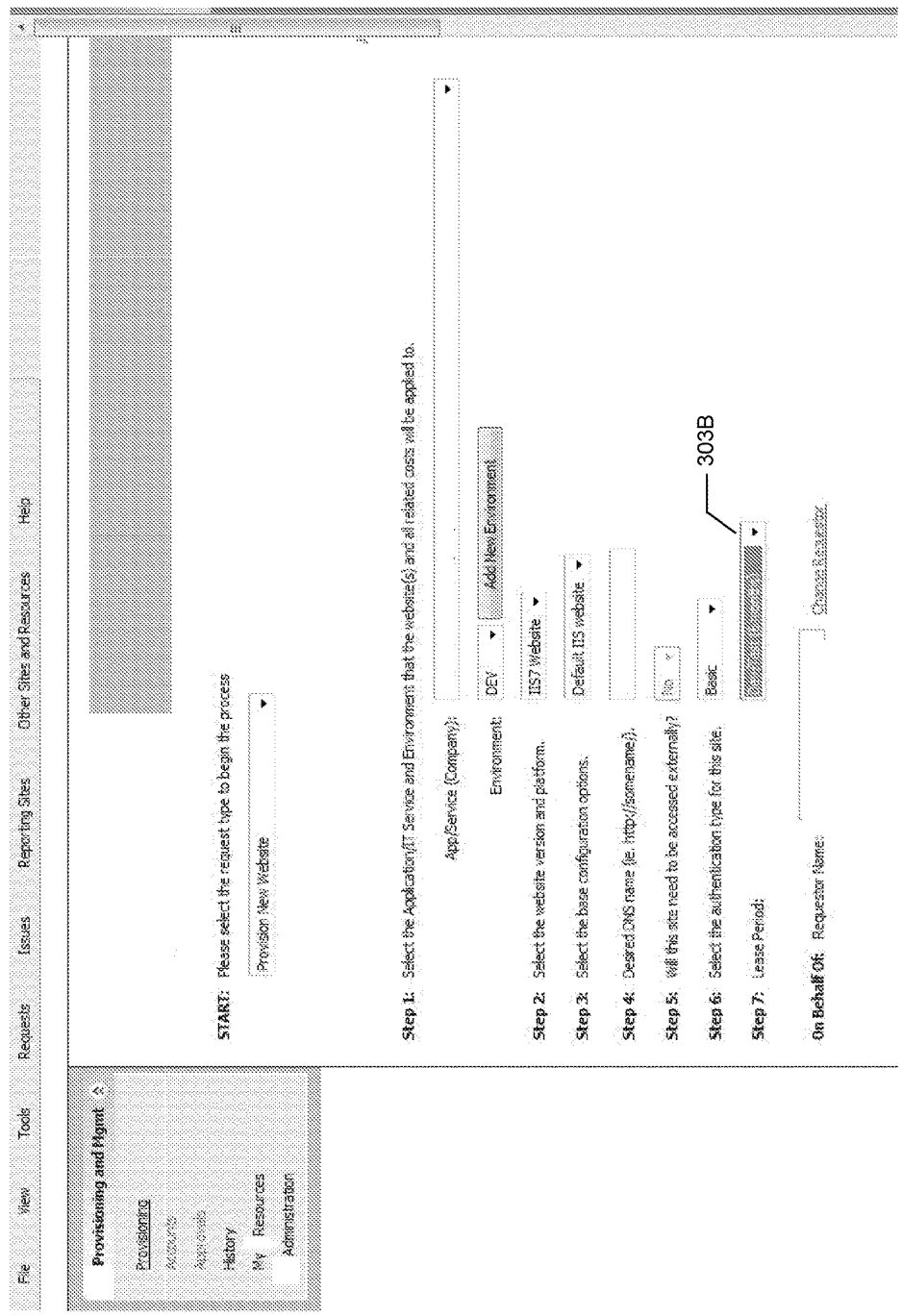

FIGS. 3A and 3B depict example user interfaces 300A and 300B that provide various input forms used to define provisioning data. For example, as illustrated in FIG. 3A, a user may interact with a menu component 302A of the user-interface 300A to select from a list of possible provisionings supported by the system (e.g. the server 202). In the specific example of FIG. 3A, a selection to provision new virtual server is illustrated. In another example, as shown in FIG. 3B, a user may interact with a menu component 304B of a user-interface 300B to make a selection indicating that the user would like to provision a computing resource for a specific amount of time, such as 6 month period (i.e. the amount of time for which the particular resource will be leased).

Figure 3C:
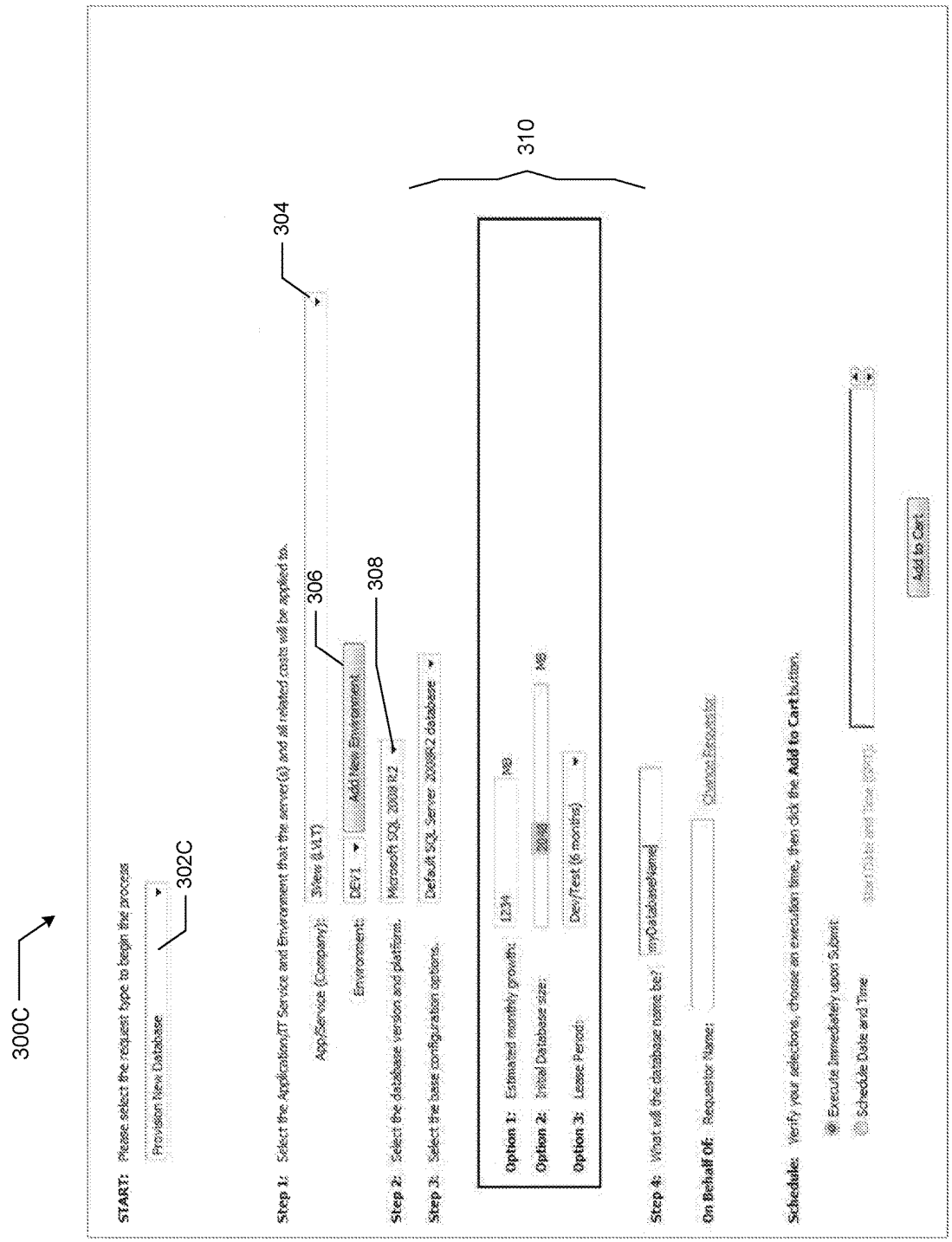
Figure 3D:
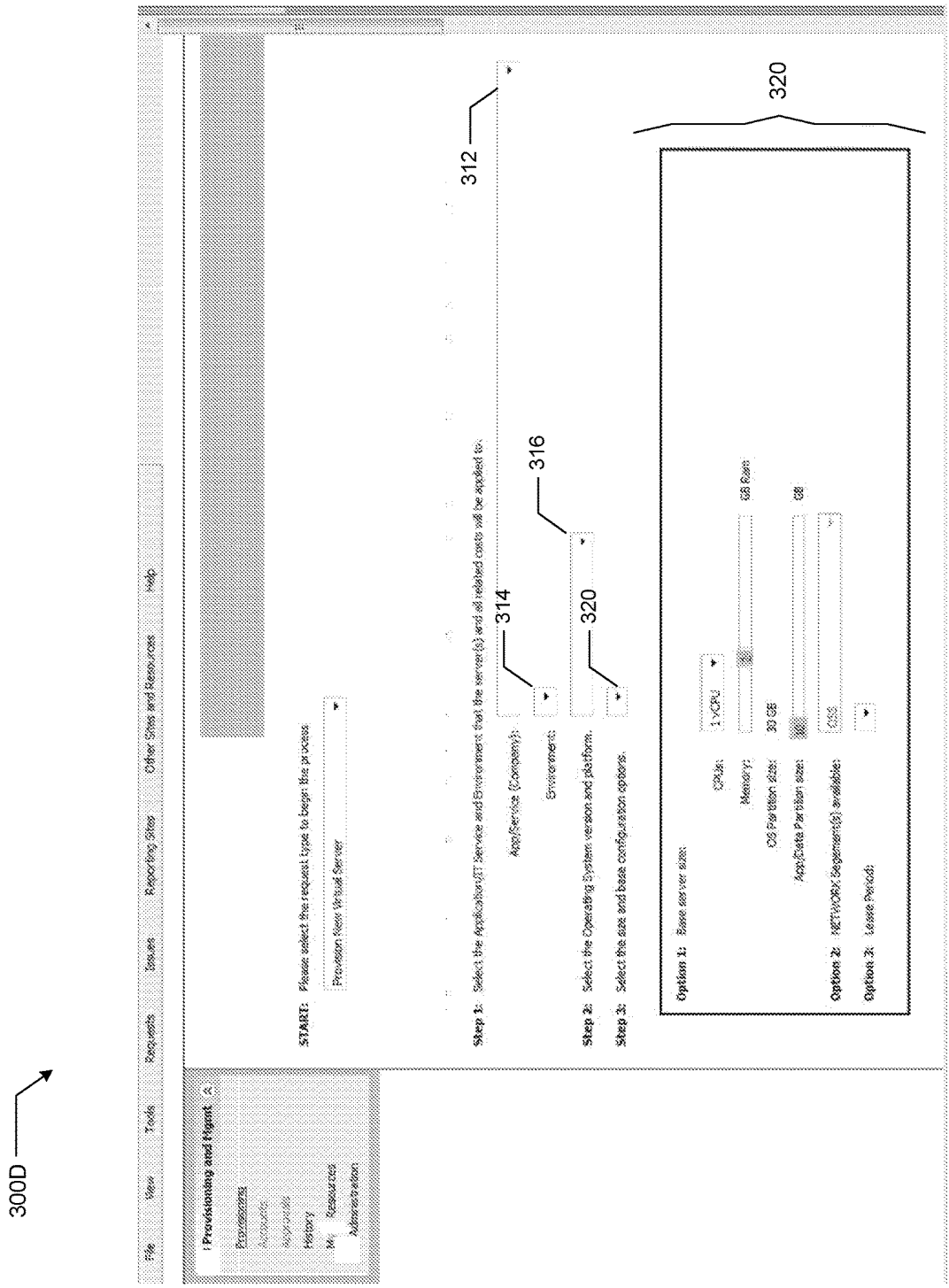

FIG. 3C depicts an example user interface that provide various input forms used to define provisioning data and provision a computing resources. More particularly, as illustrated, a user may interact with a menu component 302C of the user-interface 300C to select from a list of possible provisionings supported by the system. In the specific example of FIG. 3C, a selection to provision new database is illustrated. Various other components illustrated on the user-interface 300C depict the various parameters that may correspond to a database provisioning request. For example, a user may provide a selection of a particular application service 304C and environment 306C to which the database will be applied. A user may provide a selection of a particular database version and platform 308 and further may select the base configuration options 310C for the database. The base configuration options 310C may include an estimated monthly growth in size of the database, an initial database size, and/or a lease time period for the database. Various other provisioning data inputs may be provided, such as name and scheduling information that indicates a particular time in which the resource should be provisioned, as illustrated. FIG. 3D is yet another example illustration of a user interface, and in particular, an interface to define and provision a virtual server and the various parameters for configuring a virtual server (312-320).

Referring again to FIGS. 1 and 2, the various interfaces may be generated by the server 202. In particular, the server 202 of FIG. 2 may provide a mechanism, process, and/or application, such as the provisioning application 208, which, when executed, generates the various GUIs through which a user may define or otherwise provide provisioning data identifying one or more computing resources to be provisioned. The server 202 may be a personal computer, work station, server, mobile device, mobile phone, processor, and/or other type of processing device and may include one or more processors that process software or other machine-readable instructions. The server 202 may further include a memory to store the software or other machine-readable instructions and data and a communication system to communicate via a wireline and/or wireless communications, such as through the Internet, an intranet, and Ethernet network, a wireline network, a wireless network, and/or another communication network. The server 202 may include or be connected with a database 210, which may be a general repository of data including data, provisioning data, application data and/or any other data relating to the provisioning and allocation of resources. The database may include memory and one or more processors or processing systems to receive, process, query and transmit communications and store and retrieve such data. In another aspect, the database may be a database server.

A user interested in provisioning one or more resources may interact with one or more client device(s) 206 to initiate a request for provisioning computing resources, which may be received by the server 202. More particularly, the one or more client devices 206 may also include a user interface ("UI") application 212, such as a browser application, to generate a request for provisioning resources. In response, the server 202 may transmit instructions that may be processed and/or executed to generate, or otherwise display, the various interfaces generated by the provisioning application 208 for receiving input (e.g. provisioning data). The client devices 206 may be a personal computer, work station, mobile device, mobile phone, tablet device, processor, and/or other processing device capable of implementing and/or executing processes, software, applications, etc. Additionally, the client devices 206 may include one or more processors that process software or other machine-readable instructions and may include a memory to store the software or other machine-readable instructions and data. The client devices 206 may also include a communication system to communicate with the various components of the server 202 via a wireline and/or wireless communications, such as through a network 218, such as the Internet, an intranet, an Ethernet network, a wireline network, a wireless network, a mobile communications network, and/or another communication network. The various interactive interfaces generated in response to a provisioning request may be displayed at the client devices 206.

Referring again to FIG. 1, the server 202 may process any input (e.g. provisioning data) received at the client devices 206 to identify a workflow process suitable for provisioning a computing resource identified as part of the provisioning data (operation 104). A workflow process is a document, procedure, and/or instruction set that articulates how a particular resource should be configured or implemented, and subsequently tested and managed to ensure that the resource is behaving as intended. Stated differently, a workflow process describes one or more provisioning tasks or steps and controls the procedural execution sequence of such tasks/steps. A workflow process may be specific to an individual resource and/or a set of resources. In one embodiment, a workflow process may include, reference, or otherwise correspond to the parameters included within the provisioning data, and such a correspondence may be used to identify the workflow processes that may be executed to provision the identified computing resource. The workflow processes may be generated using any standard workflow language standards, such as HP Operations Orchestration software and the like, as are generally known in the art.

After receiving the provisioning data and/or identifying any workflow processes, a workflow engine may be invoked to process and/or otherwise execute the workflow processes to provision the one or more resources (operation 106). For example, a workflow engine 218 of FIG. 2, may be invoked to execute the procedures and/or instructions defined within the one or more workflow processes identified by the server 202 to configure or otherwise provision a resource. The may be part of another external system, as illustrated in FIG. 2, and/or may be workflow engine may be internal to the server 202.

Figure 4:
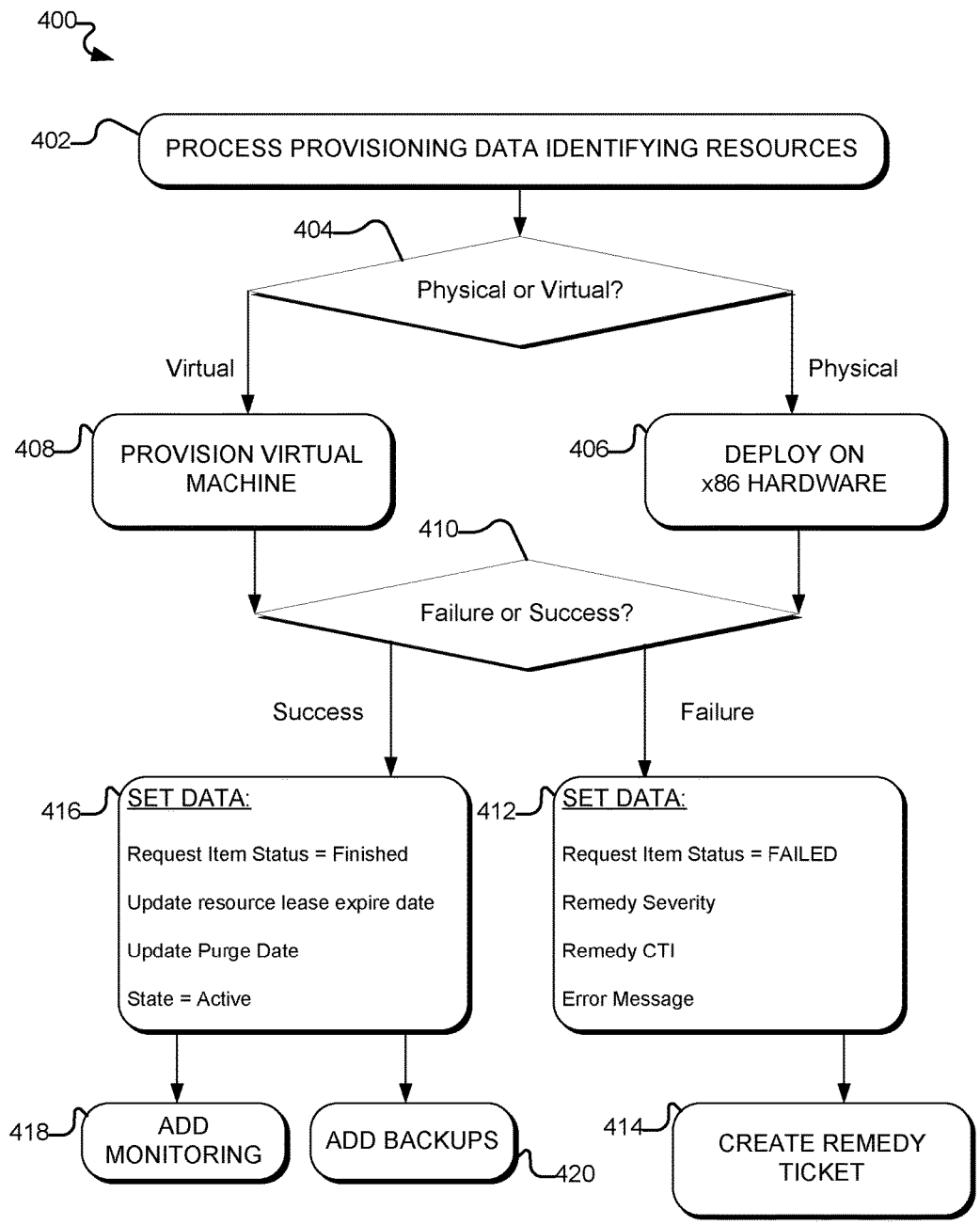
FIG. 4 is a flowchart illustrating an example workflow used to provision computing resources.

FIG. 4 illustrates and example workflow process 400 that may be identified from the processed parameters of the provisioning data, according to one embodiment. In the particular embodiment illustrated in FIG. 4, the workflow process 400 may be processed to configure multiple resources. More particularly, various data inputs (e.g. provisioning data) articulating how and which resources should be provisioned may be provided and processed (at 402). For example, the data inputs include may include data corresponding to an operating system, development environment, and storage. The data inputs are processed to determine whether such resources will be will be configured as a physical resource (at 404). If the provisioned resources are physical, the resources may be deployed on x86 hardware, as is generally known in the art (at 406). Alternatively, if the provisioned resources are determined to be virtual, a virtual machine may be provisioned corresponding to the resource (at 408).

Virtualization refers to the various techniques, methods and/or approaches used to generate a virtual (rather than physical) version of a computing resource, such as a virtual hardware platform, operating system, storage device, or network resources. Hardware virtualization refers to the creation of a virtual machine that behaves like a single physical computing device with an operating system. Any software executed on the virtual machine is separated from the underlying hardware resources. For example, a virtual machine may be generated based on the amount of storage required to store a particular application and the amount of storage required to execute the application, but the application is maintained separately from the underlying hardware.

It is contemplated that within the context of the various embodiments described herein, any provisioned resource may be virtualized or in implemented in conjunction with hardware virtualization, such as a virtual machine.

Referring again to FIG. 4, the "Set Data" operations of the workflow 400 represent the recording of state information regarding the provisioning request. As the state of the request changes it is updated and used to drive failure actions or success actions. For example, should a failure occur during the request, set data information is recorded such as: request item status=failed; a remedy severity level; and any error messages (at 412). Subsequently, a trouble ticket may be automatically generated to allow support staff to investigate the root cause and either correct the issue or resubmit the request. Alternatively, when provisioning requests are successful, set data information is recorded such as: request item status=finished; an update to any resource leases (the amount of time in which the resource will exist); and the state of the resource may be set to active. Additionally, the automated workflow will automatically add the necessary components required by the IT operations staff, such as automated configuration backups (at 418) and/or automated health monitoring (at 420) of the newly created resource.

Referring again to FIG. 1, once the particular resource has been provisioned, the resource is initiated and provided for access (operation 108). The provisioned resource is fully functional, live and running, and capable of supporting and/or executing processes of the associated computing application, process, and/or service for which the computing resource was originally provisioned. In one embodiment, the underlying configuration of the provisioned resource may not be accessible by a user. For example, if the provisioned resource were an operating system, the operating system would be live and ready for user access, such as through a user login, but the underlying configurations of the provisioned operating system would not be accessible by the user, ensuring the integrity of such underlying configurations. As another example, if the provisioned resource was an application cluster, access to the application cluster layer would be provided, not access to the underlying provisioned resources required to support the application cluster. In one particular embodiment, it is contemplated that the provisioned resources may be provided as a service in a cloud computing architecture and/or the like.

Any resources provisioned may be returned or de-allocated for reuse. More particularly, a provisioning request creates and records the existence of new resources (i.e. virtual servers, websites, databases, etc). Once created, additional requests can be performed on those resources which get submitted into the request framework just like a provisioning request. The workflow in those cases will perform some action on the existing resource, for example temporarily deactivate the resource, reactivate the resource, or decommission the resource. During provisioning one of the parameters indicates the lease for the resource and when the lease expires the system will automatically submit a deactivation request for a resource if not renewed by the owner. Once a time period specified in the lease passes the resource is then automatically decommissioned to return the resource back into the pool.

Stated differently, for every provisioning workflow there may be a deactivation, reactivation, and de-allocation (or decommission) workflow. The de-allocation workflow represents a reverse order of the provision workflow and is intended to return the individual resources (like compute, memory, and storage) to the "free" pool to be re-allocated at a later time. The system (e.g. the server 202) maintains a list of every resource within its control, for example in one embodiment, in the form of a set of meta-data, including the current state of each resource and every action performed against the resource. Any resource that can be provisioned can be de-allocated (or decommissioned).

Figure 5:
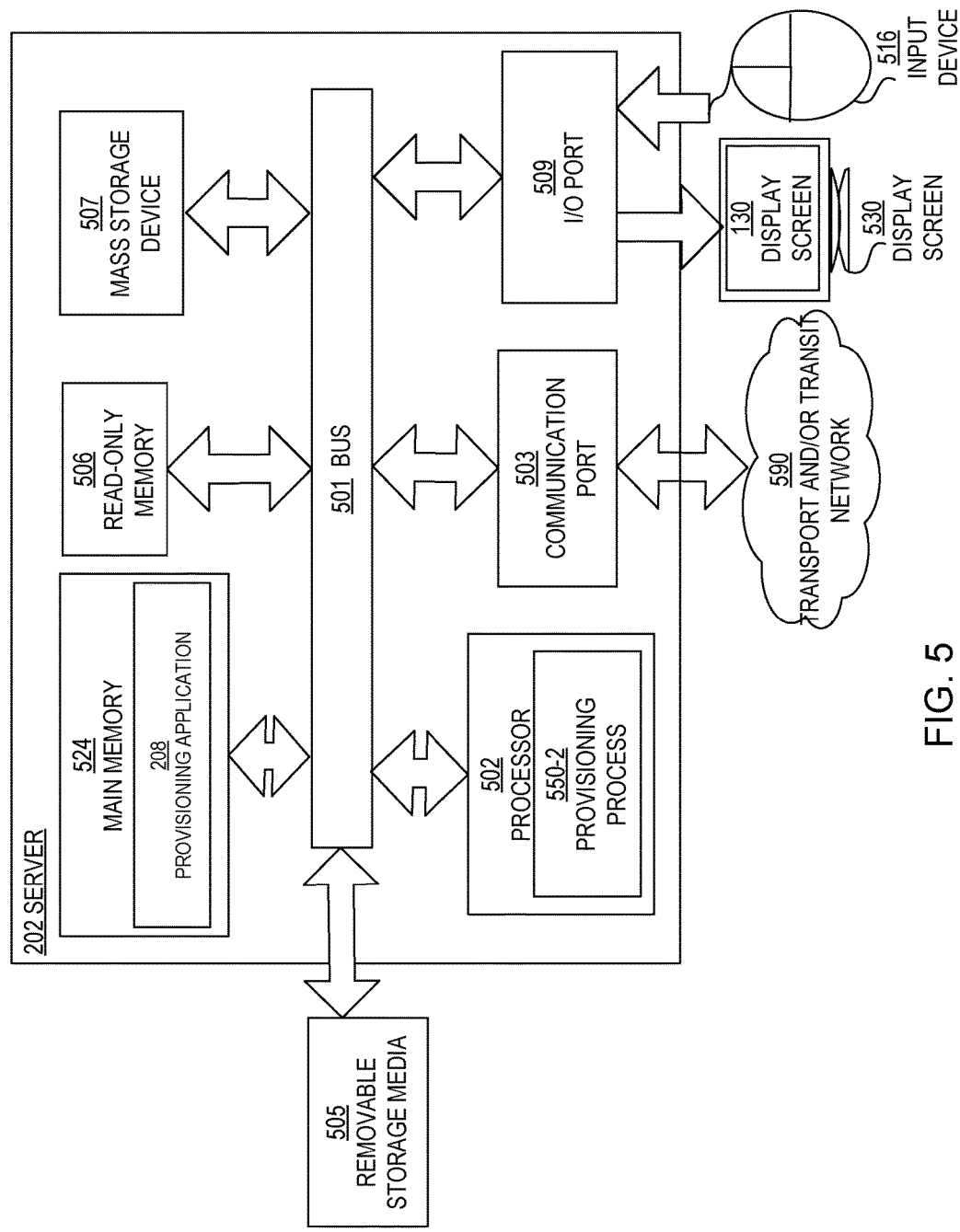
FIG. 5 is a diagram of a computing system, according to aspects of the present disclosure.

FIG. 5 is example schematic diagram of a computing system implementing a server or computing system (e.g. server 202) that may be use to provision resources, according to one embodiment. The computing system for the server 202 includes a bus 501 (i.e., interconnect), at least one processor 502, at least one communication port 503, a main memory 504, a removable storage media 505, a read-only memory 506, and a mass storage device 507. Processor(s) 502 can be any known processor, such as, but not limited to, an Intel® Itanium® or Itanium 2® processor(s), AMD® Opteron® or Athlon MP® processor(s), or Motorola® lines of processors. Communication port 503 can be any of an RS-232 port for use with a modem based dial-up connection, a 10/100 Ethernet port, a Gigabit port using copper or fiber, or a USB port. Communication port(s) 503 may be chosen depending on a network such as a Local Area Network (LAN), a Wide Area Network (WAN), or any network to which the computer system 100 connects. The server 202 may be in communication with peripheral devices (e.g., display screen 530, input device 516 via Input/Output (I/O) port 509.

Main memory 504 can be Random Access Memory (RAM) or any other dynamic storage device(s) commonly known in the art. Read-only memory 506 can be any static storage device(s) such as Programmable Read-Only Memory (PROM) chips for storing static information such as instructions for processor 502. Mass storage device 507 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 501 communicatively couples processor(s) 502 with the other memory, storage and communications blocks. Bus 501 can be a PCI/PCI-X, SCSI, or Universal Serial Bus (USB) based system bus (or other) depending on the storage devices used. Removable storage media 505 can be any kind of external hard drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 504 is encoded with the provisioning application 208 that supports functionality as discussed above and as discussed further below. For example, in one embodiment, the provisioning application 208 may include or otherwise implement the various processes and/or instructions described herein. The provisioning application 208 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 502 accesses main memory 504 via the use of bus 501 in order to launch, run, execute, interpret or otherwise perform the logic instructions of the provisioning application 208. Execution of the provisioning application 208 produces processing functionality in provisioning process 550-2. In other words, the provisioning process 550-2 represents one or more portions of the provisioning application 208 performing within or upon the processor(s) 202 in the computer system 500.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for provisioning a resource comprising:
   receiving, at one or more processors, provisioning data including one or more selections that identify at least one resource to be provisioned and one or more parameters describing one or more provisioning configurations for the at least one resource, the one or more parameters describing one or more provisioning configurations for the at least one resource including an estimated growth parameter;
   processing, at the one processor, the one or more parameters to identify at least one workflow process including one or more provisioning steps corresponding to the one or more provisioning configurations;
   invoking, at the one processor, a workflow engine using the at least one workflow process to provision the at least one resource in accordance with the identified at least one workflow process; and
   initiating the provisioned at least one resource to generate an instance of the provisioned at least one resource.

2. The method of claim 1, wherein the one or more provisioning configurations includes a virtualization configuration, and wherein processing the at least one workflow process comprises implementing a virtual version of the at least one resource.

3. The method of claim 2, further comprising providing one or more graphical user interfaces including various interactive components to receive the provisioning data.

4. The method of claim 3, wherein the at least one resource is at least one of an application server, operating system, database, application, and a database server.

5. A system for provisioning a resource comprising:
   at least one processor; and
   at least one memory, operatively connected to the at least one processor and containing instructions that, when executed by the at least one processor, cause the system to:
   receive provisioning data including one or more selections that identify at least one resource to be provisioned and one or more parameters describing one or more provisioning configurations for the at least one resource, the one or more parameters describing one or more provisioning configurations for the at least one resource including an estimated growth parameter;
   process, via the at least one processor and the at least one memory, the one or more parameters to identify at least one workflow process, the workflow process including one or more provisioning steps corresponding to the one or more provisioning configurations;
   invoke a workflow engine, via the one processor and the at least one memory, using the at least one workflow process as input to provision the at least one resource in accordance with the identified at least one workflow process; and
   initiate the provisioned at least one resource to generate an instance of the provisioned at least one resource.

6. The system of claim 5, wherein the one or more provisioning configurations includes a virtualization configuration and wherein processing the at least one workflow process comprises implementing a virtual version of the at least one resource.

7. The system of claim 6, the instructions further causing the at system to provide one or more graphical user interfaces including various interactive components to receive the provisioning data.

8. The system of claim 7, wherein the at least one resource is at least one of an application server, operating system, database, application, and a database server.

9. A non-transitory computer-readable medium encoded with instructions for provisioning a resource, the instructions, executable by at least one processor, comprising:
  receiving provisioning data including one or more selections that identify at least one resource to be provisioned and one or more parameters describing one or more provisioning configurations for the at least one resource, the one or more parameters describing one or more provisioning configurations for the at least one resource including an estimated growth parameter;
  processing the one or more parameters to identify at least one workflow process including one or more provisioning steps corresponding to the one or more provisioning configurations; and
  invoking a workflow engine using the at least one workflow process as input to provision the at least one resource in accordance with the identified at least one workflow process; and
  initiating the provisioned at least one resource to generate an instance of the provisioned at least one resource.

10. The non-transitory computer-readable medium of claim 9, wherein the one or more provisioning configurations includes a virtualization configuration, and wherein processing the at least one workflow process comprises implementing a virtual version of the at least one resource.

11. The non-transitory computer-readable medium of claim 10, further comprising providing one or more graphical user interfaces including various interactive components to receive the provisioning data.

12. The non-transitory computer-readable medium of claim 11, wherein the at least one resource is at least one of an application server, operating system, database, application, and a database server.

* * * * *